United States Patent [19]
Lindenmuth

[11] Patent Number: 4,521,056
[45] Date of Patent: Jun. 4, 1985

[54] MODULAR, MULTI-POSITION ARM REST

[75] Inventor: Donald C. Lindenmuth, Utica, Mich.

[73] Assignee: General Motors Corporation, Detroit, Mich.

[21] Appl. No.: 596,056

[22] Filed: Apr. 2, 1984

[51] Int. Cl.³ .............................................. B60N 1/06
[52] U.S. Cl. .................................. 297/412; 248/118; 296/153; 297/194
[58] Field of Search ............... 297/194, 411, 412, 115; 248/118; 296/153

[56] References Cited

U.S. PATENT DOCUMENTS

| 2,661,052 | 12/1953 | Bushong | 297/412 X |
| 3,046,573 | 7/1962 | Davis, Sr. et al. | 297/411 X |
| 3,123,403 | 3/1964 | Hood | 297/412 |
| 3,279,853 | 10/1966 | Cromwell et al. | 297/412 |
| 3,620,566 | 11/1971 | Leconte | 248/118 X |
| 4,165,898 | 8/1979 | Janz | 296/153 |
| 4,190,284 | 2/1980 | Schmidhuber | 297/194 |
| 4,417,764 | 11/1983 | Marcus et al. | 297/194 |

Primary Examiner—James T. McCall
Attorney, Agent, or Firm—Patrick M. Griffin

[57] ABSTRACT

A modular arm rest allows doors of either hand, front or rear, to be accommodated with just two standard parts. A base attached to the door has a symmetrically arranged pair of receptacle receiving cavities, either or both of which may be covered by a cover which will fit either way on the base.

2 Claims, 4 Drawing Figures

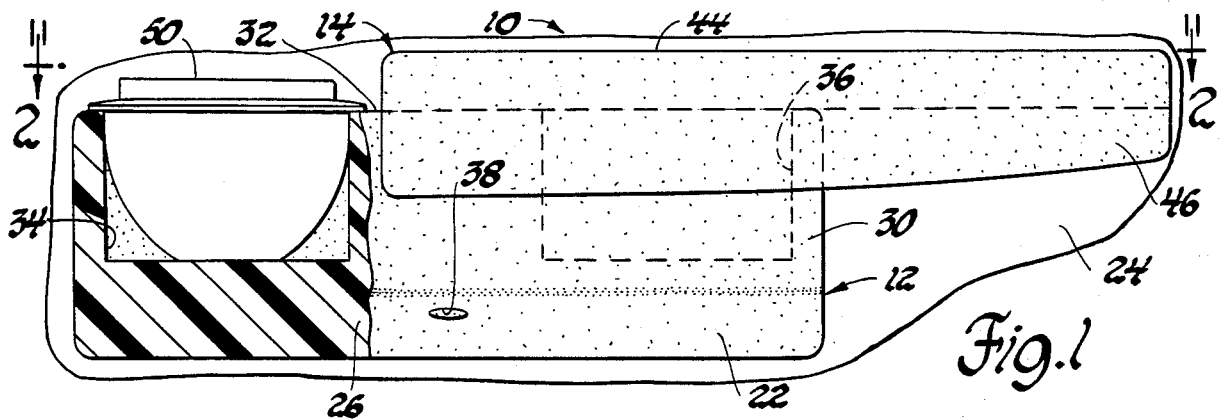
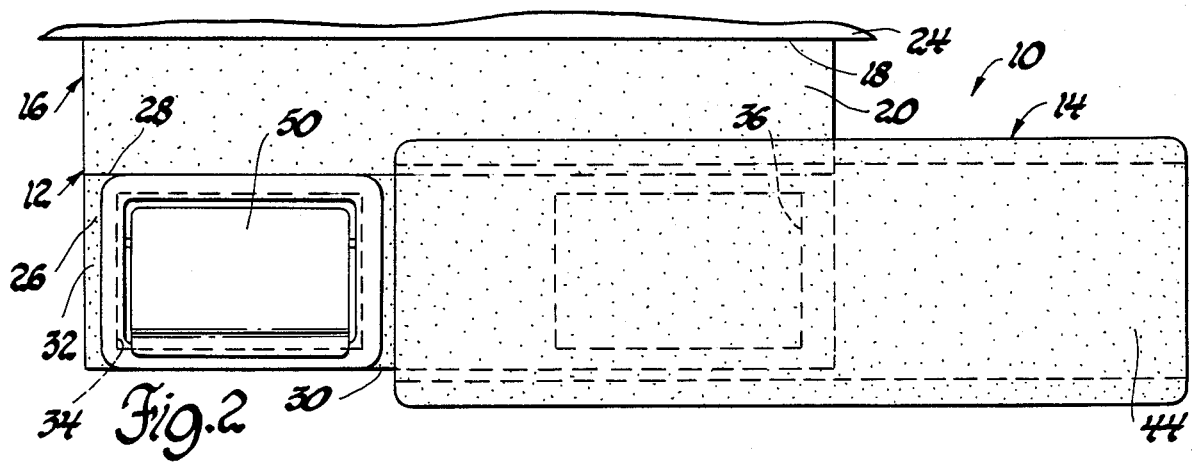
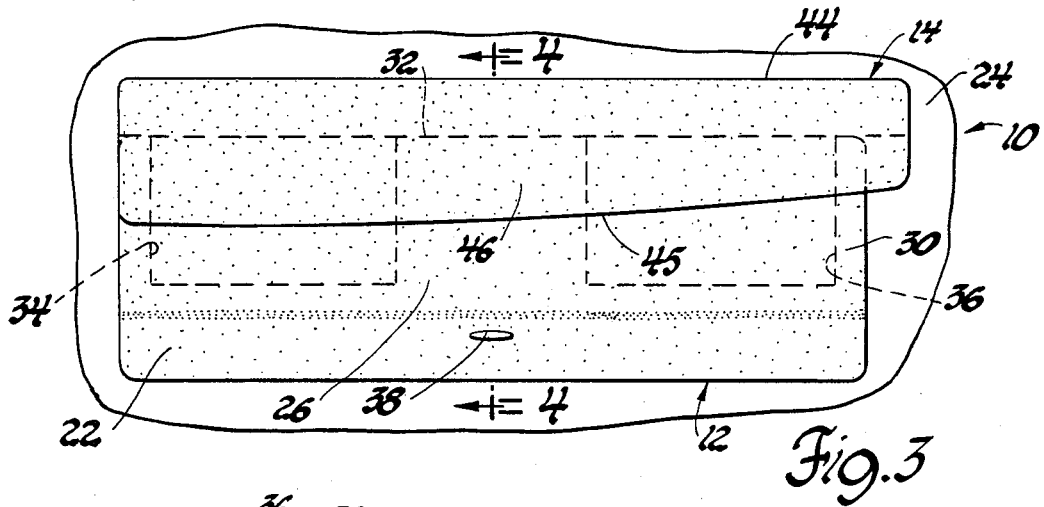
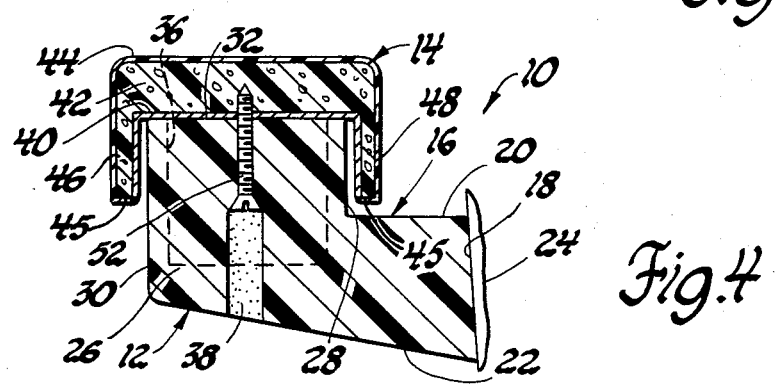

MODULAR, MULTI-POSITION ARM REST

This invention relates to arm rests and particularly to a two-piece modular arm rest which may be used in a plurality of configurations on the doors of a vehicle or the like.

BACKGROUND OF THE INVENTION

In a typical four door vehicle, the combined arm rest and door pull for each of the front and rear doors requires a separate unit because of the different hand of the doors and because it is often desirable to include a receptacle such as an ashtray in the rear of the vehicle. This is, obviously, more expensive than would be a single unit which could be used in a plurality of configurations, because of the increased costs of manufacture and inventory storage. The Cromwell et al. U.S. Pat. No. 3,279,853, assigned to the assignee of the present invention, shows an arm rest assembly having a mounting bracket and a pad which may be used on doors of either hand because the mounting bracket is symmetrical about the longitudinal center thereof. However, the structure there disclosed does not incorporate a receptacle.

SUMMARY OF THE INVENTION

The arm rest assembly of the invention comprises two pieces, but may be used on doors of either hand and incorporates a receptacle, or not, as desired. This allows all four doors of a typical vehicle to be accommodated. The two pieces of the assembly are a base and an arm rest pad which may be joined together in several possible configurations. The base has a mounting portion which may be joined to the inside of the door and a body portion which is generally rectangular in shape and is set outwardly from the inside of the vehicle door, when the base is mounted thereto, to provide room for the gripping thereof. The body portion also includes a pair of generally rectangular recesses or cavities at each end thereof arranged symmetrically about a central plane of the body portion. These are sized to receive a receptacle such as an ashtray.

The arm rest pad has a generally rectangular top wall sized large enough to cover the entire body portion and a pair of parallel, depending side walls which extend down over the sides of the body portion. This allows the pad to be shifted fore and aft on the body portion to uncover one or none of the recesses therein. A recessed screw or other fastening member accessible through the bottom of the body portion between the recesses allows the pad to be attached to the body portion in any desired position. Thus, in a typical four door vehicle, the arm rest pad may be attached to the body portion covering both recesses and used on front doors of either hand, as well as used on the rear doors of either hand, with a recess uncovered to allow the insertion of an ashtray or like receptacle.

It is, therefore, the object of the invention to provide an arm rest assembly of only two pieces usable on doors of either hand with or without an included receptacle therein.

DESCRIPTION OF THE PREFERRED EMBODIMENT

The objects and features of the invention will appear from the following description and drawings in which:

FIG. 1 is a side view of the arm rest assembly and part of a door panel with one of the recesses revealed.

FIG. 2 is a plan view of the arm rest assembly.

FIG. 3 is a view from the same perspective as FIG. 1 showing a different configuration of the assembly.

FIG. 4 is a view taken along the line 4—4 of FIG. 3.

Referring first to FIGS. 2 and 4, the two piece arm rest assembly of the invention designated generally at 10 includes two basic parts, a base designated generally at 12 and an arm rest pad designated generally at 14. Base 12 includes a mounting portion designated generally at 16 with a flat mounting face 18, generally horizontal upper wall 20, and a generally upwardly sloping bottom wall 22. Mounting face 18 would be joined to a door panel or other member designated at 24 by any conventional means, not shown.

Integral with mounting portion 16 is a body portion designated generally at 26 which includes generally parallel inner and outer side walls 28 and 30 joined by a horizontal top wall 32. After attachment to door panel 24, the inner side wall 28 is offset therefrom, providing room for the arm rest assembly to be gripped. A pair of recesses or cavities 34 and 36 are defined in body portion 26 through top wall 32 symmetrically arranged about a plane laterally bisecting body portion 26. Centered between recesses 34 and 36 is a fastener access hole 38 opening through top wall 32. Base 12 could be molded integrally from plastic or similar material.

Arm rest pad 14 has a generally C-shaped cross section, as can be seen by referring to FIG. 4, and is of a sandwich type construction having a channel shaped metal bottom wall 40, a foam interior 42 and a vinyl or plastic covering 44. The sides of pad 12 comprise depending side walls 46 and 48 which are parallel and separated by a distance slightly greater than the separation of side walls 28 and 30 of base 12. This allows pad 14 to shift longitudinally along base 12. The length of pad 14 is greater than the length of top wall 32. As may be seen by referring to FIG. 3, the bottom edge 45 of side walls 46 and 48 is tapered. This is not strictly necessary to the invention, but may be aesthetically desired. The taper may be reversed by reversing the pad.

Referring now to FIGS. 1–4, the application of the invention may be understood. Referring first to FIG. 1, arm rest pad 14 is shown positioned covering only recess 36, with a suitable receptacle such as an ashtray 50 placed in the other recess 34. This configuration is also shown in plan view in FIG. 2. Arm rest pad 14 is held to base 12 by a self-tapping screw 52 inserted through access hole 38 and threaded through bottom wall 40. This configuration is generally desired for a rear door. Pad 14 could simply be reversed to cover recess 34, thus accommodating rear doors of either hand, with a receptacle 50 in either orientation. The other possible configuration is shown in FIG. 3, with both recesses 34 and 36 covered, and with no included receptacle. These three possible configurations are made up of only the base 12 and arm rest pad 14, with a consequent savings in inventory and cost.

It is to be understood that the invention is capable of other embodiments and is not to be limited to that disclosed.

The embodiments of the invention in which an exclusive property or privilege is claimed are defined as follows:

1. A two piece arm rest assembly for use on the inside of a vehicle door or the like and providing a plurality of configurations usable on doors of either hand with or without a receptacle included therein, comprising, in combination, a base having a mounting portion joinable to the inside of a door and a body portion, said body portion having a recess therein near each end thereof in which a receptacle may be received, and an arm rest pad overlying said base and attachable thereto, said pad being large enough to cover both of said recesses in the body portion and sufficiently shiftable longitudinally with respect to said base to uncover either of said recesses before being attached to said base, whereby the pad may be attached to the base so as to be usable on doors of either hand in a first configuration covering both recesses, and in a second configuration covering one of said recesses, and a third configuration covering the other of said recesses, so that the arm rest assembly may be attached to doors or the like of either hand with the uncovered recess in either orientation with respect to the pad to receive a receptacle or with neither recess uncovered when the arm rest assembly is not to receive a receptacle.

2. A two piece arm rest assembly for use on the inside of a vehicle door or the like and providing a plurality of configurations usable on doors of either hand with or without a receptacle included therein, comprising in combination, a base having a mounting portion joinable to the inside of a door and a body portion offset therefrom, said body portion having generally parallel side walls joined by a generally horizontal top wall, said top wall further including a pair of recesses therein in which a receptacle may be received, and an arm rest pad overlying said base and attachable thereto, said pad having a top wall large enough to cover both of said recesses in the body portion and a pair of depending parallel side walls spaced apart slightly greater than the spacing of the body portion side walls, said pad side walls fitting over said body portion side walls to allow the pad to be shifted sufficiently longitudinally with respect to the base to uncover either of said recesses before being attached to said base, whereby the pad may be attached to the base so as to be usable on doors of either hand in a first configuration covering both recesses, and in a second configuration covering one of said recesses, and a third configuration covering the other of said recesses, so that the arm rest assembly may be attached to doors or the like of either hand with the uncovered recess in either orientation to the pad to receive a receptacle, or with neither recess uncovered when the arm rest assembly is not to receive a receptacle.

* * * * *